United States Patent [19]

Nagano et al.

[11] 4,150,425
[45] Apr. 17, 1979

[54] MODULE FAILURE ISOLATION CIRCUIT FOR PARALLELED INVERTERS

[76] Inventors: Robert A. Frosch, Administrator of the National Aeronautics and Space Administration with respect to an invention of Satoshi Nagano, Long Beach, Calif.

[21] Appl. No.: 876,431

[22] Filed: Feb. 9, 1978

[51] Int. Cl.² .............................................. H02M 1/18
[52] U.S. Cl. ....................................... 363/56; 307/82; 363/71; 363/97
[58] Field of Search ...................... 307/82; 363/55, 56, 363/71, 72, 80, 97, 131, 133, 134

[56] References Cited

U.S. PATENT DOCUMENTS

| | | | |
|---|---|---|---|
| 3,490,028 | 1/1970 | Modiano | 363/17 |
| 3,657,631 | 4/1972 | Martens et al. | 363/26 |
| 4,061,957 | 12/1977 | Jan Vader | 363/71 |

*Primary Examiner*—William M. Shoop
*Attorney, Agent, or Firm*—Monte F. Mott; John R. Manning; Paul F. McCaul

[57] ABSTRACT

A module failure isolation circuit for paralleled inverters senses and averages the collector current of each inverter power transistor and compares the collector current of each power transistor with the average collector current of all power transistors to determine when the sensed collector current of a power transistor in any one inverter falls below a predetermined ratio of the average collector current. The module associated with any transistor that fails to maintain a current level above the predetermined ratio of the average collector current is then shut off. A separate circuit detects when there is no load, or a light load, to inhibit operation of the isolation circuit during no load or light load conditions.

8 Claims, 2 Drawing Figures

MODULE FAILURE ISOLATION CIRCUIT FOR PARALLELED INVERTERS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to multi-module paralleled inverter system and more particularly to a circuit for detecting when any one of the modules connected in parallel fails and isolating the failed module from the rest of the working modules [in order to shut down the module] for at least as long as the failure condition continues.

The use of active redundant inverter modules connected in parallel to a load has become a well accepted practice in the power conditioning field for spacecraft application. The practice has gained wide acceptance due to the flexibility provided by the individual modules for expanding, or reducing, power output capability, and for providing more reliable performance through redundant modules which can take over the load when one or more of the modules experiences some failure. However, since the modules operate in parallel, there is a possibility that failure of certain types in any one of the modules may result in a total system failure. For example, a total system failure could occur if the collector circuit of any one of the two power output transistors in a module opens. Total system failure occurs because the output transformer of the module having an open circuit in the collector of one power transistor will be driven into saturation since the other power transistor continues to operate in the normal manner. The saturated transformer then becomes a very heavy load for the output transformers for the other modules since they are connected in parallel by their secondary windings. This results in collector current having high spikes for each of the transistors operating in the other modules.

Such high spike collector currents could cause secondary breakdown effects in the remaining transistors and therefore possible total system failure. Breakdowns could also occur with an open circuit in the base of a power transistor, or in either the primary or secondary winding of the output transformer. Although fuse protection is provided between the secondary winding of the output transformer and the load, and between the primary windings of the output transformer and the DC power input, such protection may not operate as intended to prevent total system failure because the current spike may not have enough power to open the fuse, and yet have enough power to cause secondary breakdown effects. This problem of having the fuse open in time to prevent total system failure is aggravated by the practice of using slightly oversized fuses to permit some temporary overload operation. It would be desirable to sense a condition which may cause an overload operation and to remove the module having the condition from the system in order to prevent any possible total system failure.

SUMMARY OF THE INVENTION

In accordance with the present invention a plurality of inverter modules connected in parallel to load, each module having two output power transistors connected in a push-pull fashion to an output transformer, are connected to a circuit for detecting the failure of any one power transistor to deliver current greater than some predetermined ratio of the average collector current of all power transistors of the multi-module system. Such a failure of any one module operates a switching means to shut down the module for at least as long as that failure condition continues. Means for sensing the collector current of each power transistor is connected to averaging means for obtaining a signal proportional to a predetermined ratio of the average collector current of all power transistors in the multi-module system. The signal proportional to the collector current of the two power transistors in each module are then connected to means for comparing each of those two collector current signals with the ratio signal to determine when either one is less than the ratio signal. The output of the comparator actuates the switching means for shutting down base drive current to the power transistors of the failing module.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
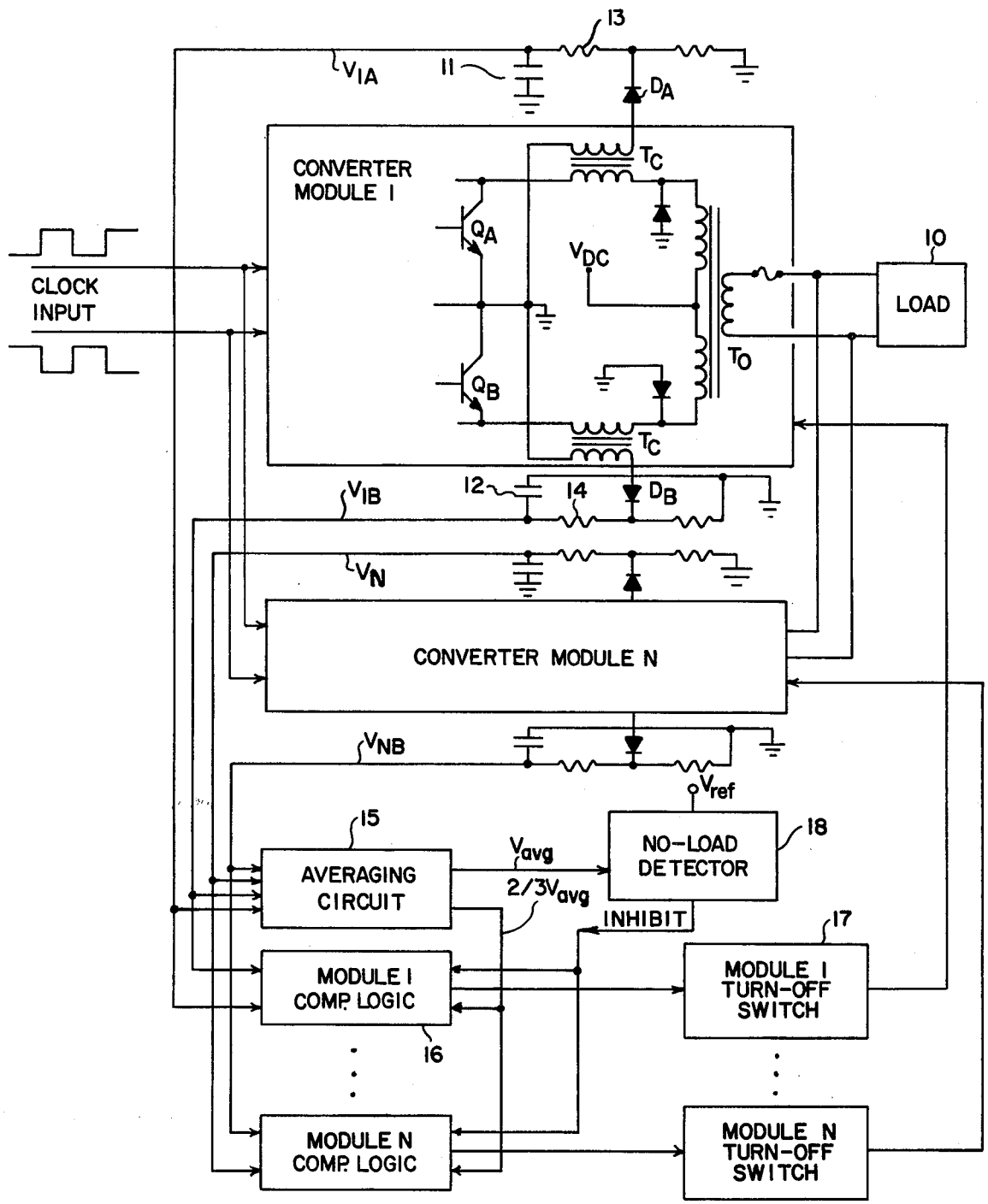
FIG. 1 is a block diagram of the present invention.

Referring now to FIG. 1 of the drawings, a plurality of modules 1 ... N are connected in parallel with a load 10, each through an output transformer $T_O$ having a secondary winding connected to the load through a fuse $F_1$ and having two primary windings connected to a power source, $V_{DC}$ through two power transistors $Q_A$ and $Q_B$. Connected in series with each primary winding of the outPut transformer, $T_O$, is a current transformer, $T_C$, used as a means for sensing the collector currents of the output power transistors $Q_A$ and $Q_B$. The collector currents are rectified by diodes $D_A$ and $D_B$ and filtered by capacitors 11 and 12 to produce at junctions with resistors 13 and 14 voltage signals $V_{1A}$ and $V_{1B}$ proportional to the collector currents sensed in module 1. The same arrangement is provided for each of the remaining modules in the multi-module system such that, for each of the modules, two voltage signals are produced proportional to the collector currents to the power transistors in the modules.

All of the voltage signals $V_{1A}, V_{1B}, \ldots V_{NA}, V_{NB}$ are connected to a circuit 15 for obtaining an average signal $V_{avg}$ and a signal which is equal to some predetermined ratio, such as two-thirds, of the average of all collector currents. The voltage signals of each module are then compared in a separate one of a plurality of comparators, such as a comparator 16 for module 1 to determine when either of the two collector currents drops below the predetermined ratio of the average collector currents as determined by the circuit 15. The comparator then transmits a signal to a turn-off switch associated with the module comparator, such as a turn-off switch 17 associated with the module 1 comparator. The turn-off switch is thus actuated for at least as long as this condition continues to shut down base drive current to both transistors of the module exhibiting this failure condition. Since the two power transistors of that module then cease to conduct, the turn-off switch will continue to be actuated, thus keeping base current to the power transistors shut off. In that manner, a module shut down remains shut down until the entire multimodule system is recycled, for example by momentarily shutting down the clock input signal to the modules which provides base drive current to alternately turn on the power transistors of each module.

To prevent unintended operation of the failure isolation circuit under light or no loading conditions when the difference between $V_{1A}$ or $V_{1B}$ and $\frac{2}{3} V_{avg}$ might be small enough to cause unintended operation, a no-load detector 18 is provided. This detector allows comparison of the system averaged voltage $V_{avg}$ with a reference voltage $V_{ref}$ which represents the average transduced magnetizing current of all the output transformers of the entire inverter system. During normal loaded operation, $V_{avg}$ exceeds the set value of $V_{ref}$, but under light or no load conditions, $V_{avg}$ drops below the level of $V_{ref}$. The output of the comparator then goes high. That inhibits all of the module comparators under light or no load conditions.

In practice, each inverter module is provided with its comparator logic and turn-off switch on the same printed circuit board. Since the averaging circuit and no-lead detector are common to all modules, they may be provided on a separate printed circuit board. However, since those functional blocks involve so few components, it is feasible to duplicate those functional blocks on the printed circuit board for each module. The redundancy thus provided makes the system more reliable.

Figure 2:
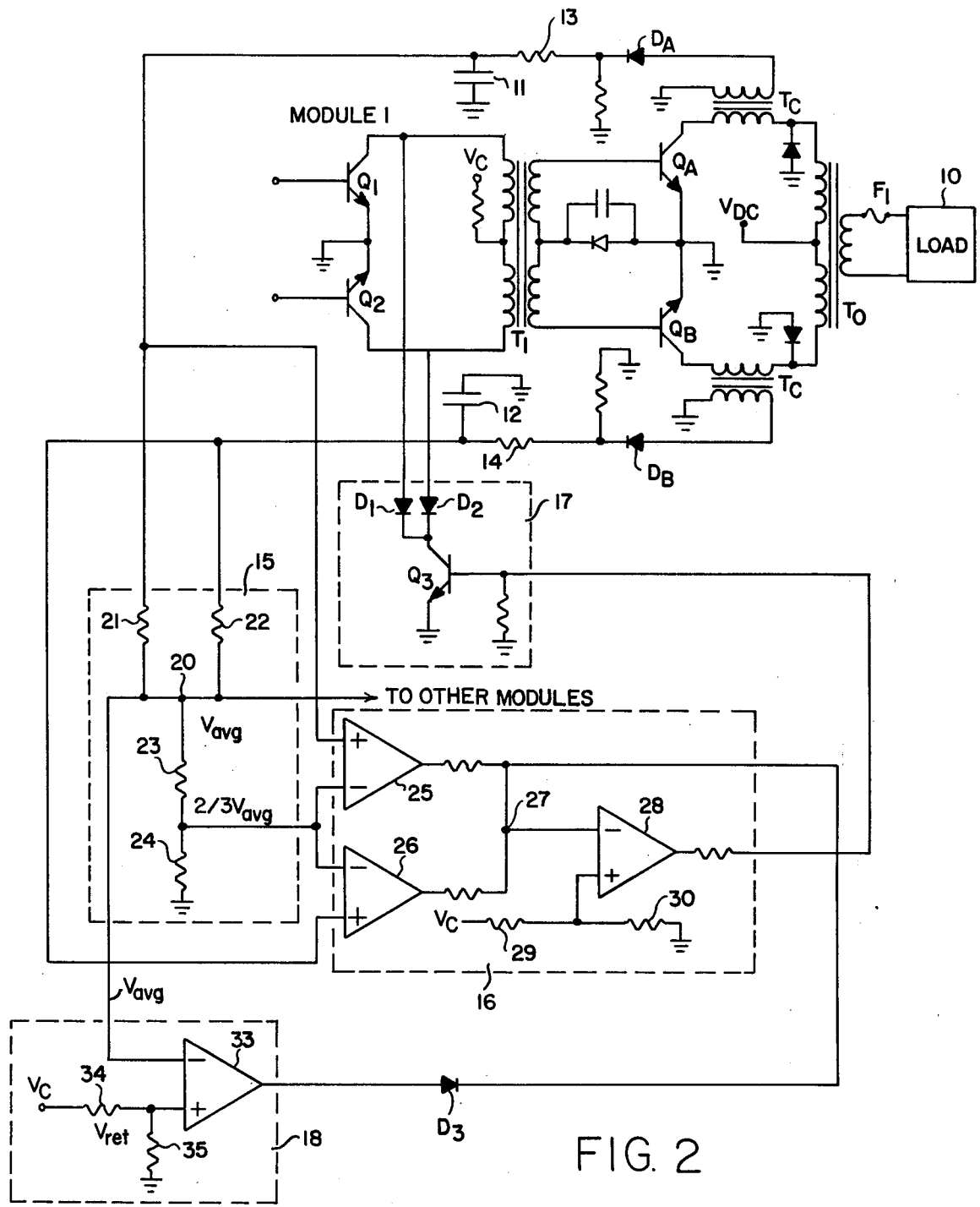
FIG. 2 is a circuit diagram of an exemplary embodiment of the present invention.

A circuit diagram for the converter module 1, averaging circuit 15, module comparator 16, module 1 turn-off switch 17 and no load detector 18 will now be described with reference to FIG. 2. The converter module includes switching transistors $Q_1$ and $Q_2$ driven by a square wave clock input to drive the base currents of power transistors $Q_A$ and $Q_B$ through a current transformer $T_1$. Diodes $D_1$ and $D_2$, together with transistor $Q_3$ constitute the module 1 turn-off switch. While that transistor is turned on by the module 1 comparator, the diodes are clamped to ground, thus blocking any base drive to the power transistors $Q_A$ and $Q_B$.

To obtain a system average signal $V_{avg}$, all of the signals representing the collector currents of the power transistors are connected to a summing junction 20 by equal coupling resistors, such as resistors 21 and 22 for the voltage signals $V_{1A}$ and $V_{1B}$. A voltage dividing network comprised of resistors 23 and 24 reduce the system average $V_{avg}$ by the ratio $\frac{2}{3}$. That ratio signal is then compared in a high gain differential amplifiers 25 and 26 with the signals $V_{1A}$ and $V_{1B}$. In that manner, only a large difference between the system average signal $V_{avg}$ and either the signal $V_{1A}$ or $V_{1B}$ will produce a saturated output from either of the differential amplifiers. These differential amplifiers thus provide the dual comparison function, i.e., these differential amplifiers constitute the module 1 comparator.

In normal operation, signals $V_{1A}$ and $V_{1B}$ are higher than $\frac{2}{3} V_{avg}$, which is a fixed proportion of the system average by the ratio, $\frac{2}{3}$ in this example, of the resistors 23 and 24. When this is the case, the output level of the differential amplifiers connected to a common output terminal 27 is substantially that of a supply voltage, $V_c$. That output terminal is connected to a third differential amplifier 28 for comparison with a reference slightly lower than $V_c$ derived from a voltage dividing network comprised of resistors 29 and 30. Therefore when the junction 27 is at substantially $V_c$ during normal operation, the output of the differential amplifier 28 is near ground. That holds transistor $Q_3$ off. While that transistor is turned off, diodes $D_1$ and $D_2$ are connected to an open circuit, i.e. the diodes have no current path to ground, so that the collector currents of the switching transistors $Q_1$ and $Q_2$ are effective across the primary windings of the transformer $T_1$. That allows normal operation of the inverter by supplying drive to the output transistors.

Whenever the sensed collector current of a power transistor $Q_A$ or $Q_B$ falls below the predetermined ratio ($\frac{2}{3}$ in the illustrated example) of the system average, one input to either comparator 25 or 26 is lower than $\frac{2}{3} V_{avg}$, and the output of either comparator will fall toward ground potential, while the other output will remain at substantially $V_c$. Coupling resistors 31 and 32 are of equal value, so the junction 27 is driven to $V_c/2$, and since this voltage is now lower than the reference derived from the voltage dividing resistor 29 and 30, the output of the differential amplifier 28 goes high (substantially $V_c$), thus turning on transistor $Q_3$ and providing a path to ground for diodes $D_1$ and $D_2$ to shunt collector current away from the current pulse transformer $T_1$. This turns off the power transistors $Q_A$ and $Q_B$. Once both power transistors are turned off, the module is shut down, and will remain shut down since the collector current of each power transistor is below the predetermined ratio of the system average.

The no-load detector 18 is comprised of a differential amplifier 33 which compares the system average signal, $V_{avg}$, with a reference voltage less than $V_c$ derived from voltage dividing resistors 34 and 35. During normal operation, the system average will exceed the reference, and the output of the amplifier 33 remains at almost ground potential, thus reverse biasing a diode $D_3$ to take the no-load detector out of the circuit. Under light, or no load conditions, the system average will drop below the predetermined reference. The output of the amplifier 33 then goes to almost the level of $V_c$ to forward bias the diode $D_3$ and clamp the junction 27 near the voltage $V_c$ level regardless of the state of the differential amplifiers 25 and 26 which are comparing the collector currents from power transistors of a given module with the system average. In that manner the failure isolation circuits for the modules are inhibited during a light or no load conditions. The inhibiting signal continues until normal load conditions are reached.

Although particular embodiments of the invention have been described and illustrated herein, it is recognized that modifications and variations may readily occur to those skilled in the art. It is therefore intended that the claims by interpreted to cover such modifications and variations.

What is claimed is:

1. A module failure isolation circuit for paralleled inverter modules comprising
    means for sensing collector current of each inverter power transistor,
    means for averaging the collector currents of all power transistors of said paralleled inverters means for comparing the collector current of each power transistor with the average collector current of all power transistors to determine when the sensed collector current of a power transistor in any one inverter falls below a predetermined ratio of the average collector current, and means responsive to said comparing means for shutting off each inverter module having a power transistor which fails to maintain a current level above said predetermined ratio of the average collector current.

2. A module failure isolation circuit as defined in claim 1 including means for detecting when there is a light load or no load condition, and means for inhibiting operation of the failure isolation circuit during a light load or no load condition.

3. In a system having a plurality of inverters connected in parallel, each inverter having at least one power transistor for delivering current to a common load, apparatus for detecting when any one of the inverters fails and to turn off the failing inverter, comprising means for detecting the current being delivered to the load by each inverter power transistor and for producing a voltage signal proportional thereto, means for determining the average of all voltage signals of the inverter system to produce a ratio signal proportional to a predetermined ratio of the average, where said ratio is equal to less than one, means for separately comparing said load signals with said ratio signal, and for producing a separate failure indicating signal associated with each inverter producing a voltage signal which is less than said ratio signal, and separate means for each inverter responsive to a failure indicating signal for turning off the associated inverter.

4. A system as defined in claim 3, wherein said averaging means produces a signal proportional to the average of all inverter voltage signals, including means for comparing said average signal with a predetermined reference signal representative of a light load condition to determine when said inverters are delivering current to a light load, or no load and means responsive to said light-load comparing means for preventing any inverter from being turned off when said inverters are delivering current to a light load or no load.

5. A system as defined to claim 4 wherein each of said inverter turn-off means is comprised of a transistor biased off and connected to respond to a failure indicating signal to shunt control signals for the operation of the associated inverter.

6. In combination a plurality of inverter modules connected in parallel to load, each module having two output power transistors connected in a push-pull fashion to deliver current to said load, means connected to each power transistor for detecting the failure of any one power transistor to deliver current greater than some predetermined ratio of the average collector current of all power transistors, and means responsive to the detection of a failure of any one power transistor of any one inverter module for shutting down the module for at least as long as that failure condition continues.

7. The combination of claim 6 wherein said failure detecting means is comprised means for sensing the collector current of each power transistor and producing a voltage signal proportional thereto, means connected to each sensing means for obtaining a ratio signal proportional to a predetermined ratio of the average of said voltage signals, and separate means for comparing each of the two voltage signals for each inverter with the ratio signal to determine when the inverter is failing because either voltage signal is less than the ratio signal.

8. The combination of claim 7 wherein said means for shutting down a failing module is comprised of means responsive to said comparing means for shutting down base drive current to both power transistors of the failing inverter module.

* * * * *